United States Patent
Sasaki et al.

(10) Patent No.: US 7,330,647 B2
(45) Date of Patent: Feb. 12, 2008

(54) AUTOFOCUS SYSTEM

(75) Inventors: Tadashi Sasaki, Saitama (JP);
Masayuki Miyazaki, Tokyo (JP);
Masao Wada, Tokyo (JP); Tomohisa Koizumi, Tokyo (JP)

(73) Assignee: Fujinon Corporation, Saitama (JP)

( * ) Notice: Subject to any disclaimer, the term of this patent is extended or adjusted under 35 U.S.C. 154(b) by 325 days.

(21) Appl. No.: 11/099,573

(22) Filed: Apr. 6, 2005

(65) Prior Publication Data
US 2005/0238343 A1 Oct. 27, 2005

(30) Foreign Application Priority Data
Apr. 7, 2004 (JP) ............... 2004-113489

(51) Int. Cl.
*G03B 3/10* (2006.01)
*G03B 13/36* (2006.01)
(52) U.S. Cl. .................. 396/130; 396/131
(58) Field of Classification Search .............. 396/130, 396/131, 137, 543; 348/345; 352/140; 250/201.2
See application file for complete search history.

(56) References Cited

U.S. PATENT DOCUMENTS

| | | | | |
|---|---|---|---|---|
| 4,887,117 A | * | 12/1989 | Kobayashi | ............... 396/130 |
| 5,315,340 A | | 5/1994 | Hirasawa | |
| 5,872,661 A | | 2/1999 | Suzuki et al. | |
| 6,522,480 B2 | * | 2/2003 | Nakamura | ............... 359/698 |

FOREIGN PATENT DOCUMENTS

| | | |
|---|---|---|
| EP | 1345060 A1 | 9/2003 |
| JP | 2003-279832 A | 10/2003 |

* cited by examiner

*Primary Examiner*—W. B. Perkey
*Assistant Examiner*—Rishi Suthar
(74) *Attorney, Agent, or Firm*—Birch, Stewart, Kolasch & Birch, LLP (57) ABSTRACT

In a lens system in which a momentary mode in which AF is operated when an AF switch SW2 is pressed and a continuous mode in which the AF is continuously operated can be selected, a CPU uses the AF switch SW2 for use in the momentary mode as an AF stop switch, and stops an AF process when the AF switch SW2 is pressed (turned on) in the continuous mode.

2 Claims, 7 Drawing Sheets

AUTOFOCUS SYSTEM

BACKGROUND OF THE INVENTION

1. Field of the Invention

The present invention relates to an autofocus system, and more specifically to an autofocus system having an AF facility in a continuous mode in which an automatic adjustment of the focus of a lens is continuously performed.

2. Related Art

Unlike a camera for consumer use, since a broadcasting TV camera is commonly operated by manual focus (MF) by the operation of a cameraman, AF in a momentary mode in which autofocus (AF) can operate for the automatic adjustment of the focus of a lens as necessary is proposed (for example, by Japanese Patent Application Laid-open No. 2003-279832).

In the momentary mode, when the AF switch is turned on, the AF is activated, and when the press of the AF switch is stopped and turned off, the AF stops. There is a method of immediately stopping the AF when the AF switch is turned off, and a method of stopping the AF after detecting best focus.

SUMMARY OF THE INVENTION

In capturing a quickly moving subject in sporting scenes, etc., it is basically convenient to use the AF in the continuous mode in which the AF is continuously operated as in consumer use. However, when focusing is performed on a target subject, another subject can traverse the target subject. In this case, in the AF in the continuous mode focusing is transferred to the other subject, and the focus can be lost from the target subject. Therefore, with a broadcasting TV camera under more strict focusing conditions than a camera for consumer use, there has been the disadvantage that the AF in the continuous mode is limited to a shooting operation under predetermined conditions.

The present invention has been developed to solve the above-mentioned problems, and aims at providing an autofocus system capable of using the AF in the continuous mode under various conditions for a broadcasting TV camera by preventing the trouble of the transfer of focus contrary to the intention of the cameraman.

To attain the objective, the autofocus system according to the first aspect of the present invention provides an autofocus system having an AF control device which automatically adjusts focus of a lens by controlling the focus of a taking lens, comprising a predetermined AF stop switch, wherein the AF control device stops control of the focus for the automatic adjustment of the focus of a lens while the AF stop switch is being operated. According to the present invention, the operation of the AF stops by operating the AF stop switch. Therefore, the trouble of the transfer of focus contrary to the intention of the cameraman can be easily avoided.

The autofocus system according to the second aspect of the present invention is based on the first aspect, and further comprises: a predetermined AF switch; a mode selection device which selects one of a momentary mode in which the AF control device performs control of focus for the automatic adjustment of the focus of a lens when the AF switch is operated, and stop the control of the focus for the automatic adjustment of the focus of a lens when an operation of the AF switch is stopped, and a continuous mode in which the AF control device continuously performs control of focus for the automatic adjustment of the focus of a lens, wherein the AF stop switch is effective in the continuous mode, and can also function as an AF switch and AF stop switch. That is, the AF switch used in the AF in the momentary mode is used as an AF stop switch in the continuous mode, thereby reducing the number of switch parts and successfully arranging a switch having the effects of both AF switch and AF stop switch in the optimum position for operability.

The autofocus system according to the third aspect of the present invention is based on the first or second aspect, and the AF control device controls focus for automatic adjustment of the focus of a lens based on contrast of a subject image captured on a plurality of capture surfaces arranged in positions of variable differences in optical path length. The present invention is an autofocus system using the AF in a system of difference in optical path length.

According to the autofocus system relating to the present invention, since the operation of the AF can be easily stopped in the AF in the continuous mode, the trouble of the transfer of focus contrary to the intention of the operation can be easily avoided. As a result, especially the scope of use of the AF in the continuous mode on a broadcasting TV camera can be expanded.

DETAILED DESCRIPTION OF THE PREFERRED EMBODIMENTS

The preferred embodiments of the autofocus system according to the present invention are described below in detail by referring to the attached drawings.

Figure 1:
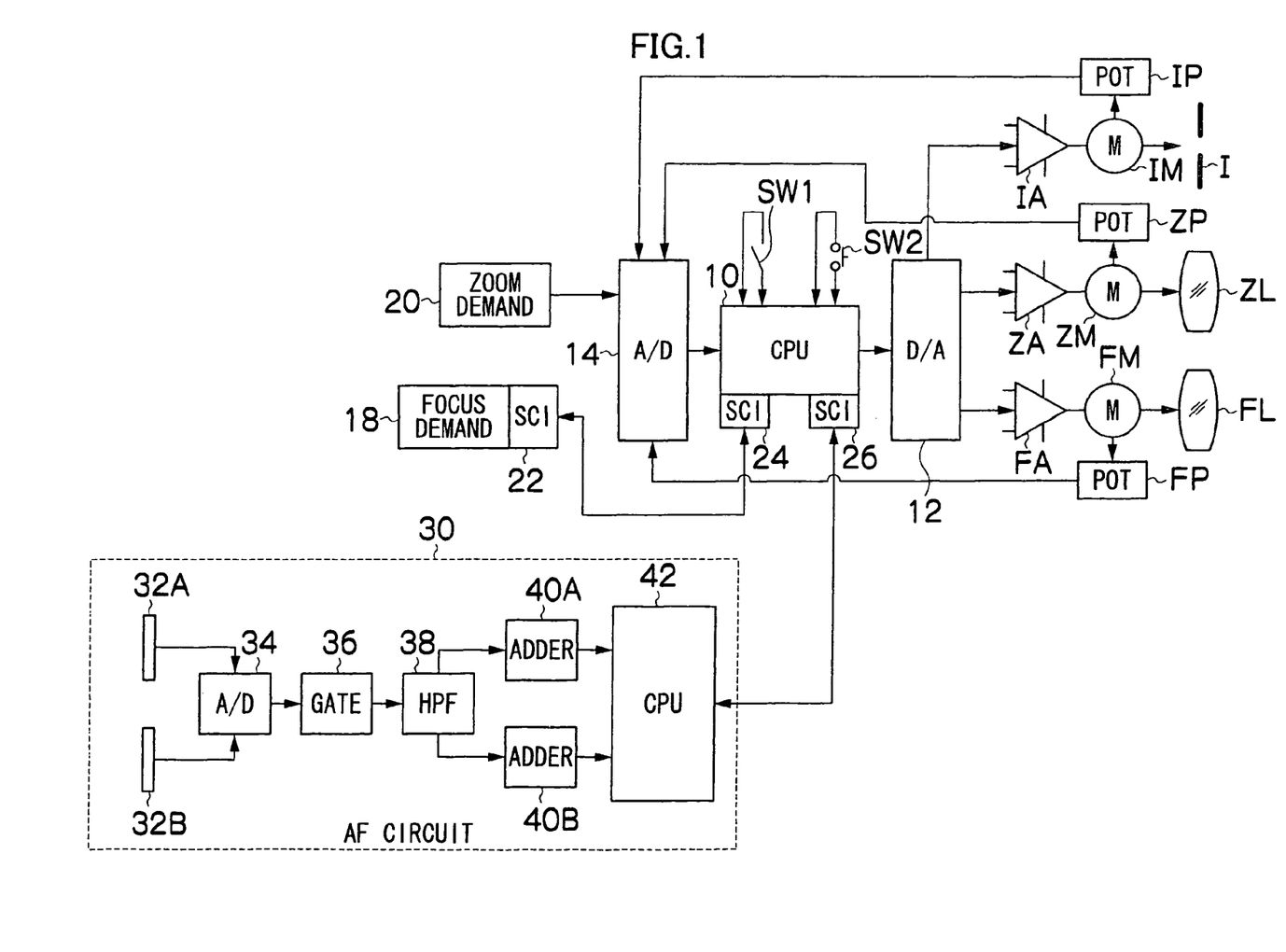
FIG. 1 is a block diagram of a lens system to which the autofocus system of the present invention is applied.

FIG. 1 is a block diagram showing the configuration of the lens system to which the autofocus system of the present invention is applied. The lens system shown in FIG. 1 is configured by a taking lens (shooting optics system) applied by mounting in the camera body (camera head) of, for example, a broadcasting TV camera, and a control system for controlling the taking lens. Any style of the device configuring the system, for example, the case in which a taking lens and a control system except a part of the system are configured as incorporated as a lens device, the case in which a taking lens and a control system are configured in separate devices, can be accepted.

A taking lens is a shooting optics system for forming an image of a subject on a capture surface of a camera body. In addition to various fixed lens group, a focus lens (group) FL, a zoom lens (group) ZL shown in FIG. 1 are arranged as a lens group to be transferred in the optical axis direction in the taking lens. When the focus lens FL travels, the focal position (subject distance) changes. When the zoom lens ZL travels, the power of an image (focal distance) changes. In the taking lens, a diaphragm I shown in FIG. 1 and opened and closed to change the diaphragm value is arranged.

The control system of a lens system is configured by a CPU 10, amplifiers FA, ZA, and IA, motors FM, ZM, and IM, a focus demand 18, a zoom demand 20, an AF circuit 30, etc. The CPU 10 centrally controls the entire system, and when the CPU 10 issues a drive signal to each of the amplifiers FA, ZA, and IA through a D/A converter 12, each of the motors FM, ZM, and IM is driven at a rotation speed depending on the value (voltage) of the drive signal. Each of the motors FM, ZM, and IM is coupled to the focus lens FL, the zoom lens ZL, and the diaphragm I of the taking lens. With the drive of each of the motors FM, ZM, and IM, the focus lens FL, the zoom lens ZL, and the diaphragm I are driven. Potentiometers FP, ZP, and IP for outputting a voltage signal depending on the rotation position are coupled to the output axis of each of the motors FM, ZM, and IM. A voltage signal from each of the potentiometers FP, ZP, and IP is transmitted to the CPU 10 through an A/D converter 14 as a signal indicating the position of the focus lens FL, the position of the zoom lens ZL, and the position of the diaphragm I. Therefore, the positions or the operation speed of the focus lens FL, the zoom lens ZL, and the diaphragm I of the taking lens are controlled to be in a desired status by the drive signal provided for each of the amplifiers FA, ZA, and IA from the CPU 10.

The focus demand 18 and the zoom demand 20 are controllers having a manual operation member for designating the target position and transfer speed of the focus (focus lens FL) and the zoom (zoom lens ZL) of the taking lens in a manual operation. The focus demand 18 is connected to the CPU 10 through serial communication interfaces (SCI) 22 and 24 in serial communication, and the zoom demand 20 is connected to the CPU 10 through the A/D converter 14.

The details are described later, but in the present lens system, the focus control can be performed by either manual focus (MF) or autofocus (AF). In the MF control, focus control is performed in the operation of the manual operation member in the focus demand 18. When a manual operation member of the focus demand 18 is operated in the MF control, a focus command signal for designating the target position of the focus corresponding to the position of the operation member is provided for the CPU 10. The CPU 10 controls the motor FM by the drive signal output to the amplifier FA such that the position of the focus can be the target position specified by the focus command signal, thus controlling the position of the focus lens FL. Normally, in the MF control, the position of the focus lens FL is controlled based on the target position provided by the focus demand 18, but the target transfer speed can be provided by the focus demand 18, and the speed of the focus lens FL can be controlled based on the provided transfer speed. The process of the CPU 10 controlling the position (or speed) of the focus lens FL according to the focus command signal provided by the focus demand 18 is hereinafter referred to as an MF process.

When the manual operation member of the zoom demand 20 is operated, for example, a zoom command signal for designation of the target transfer speed of the zoom corresponding to the position of the operation member is provided for the CPU 10. The CPU 10 controls the motor ZM using the drive signal output to the amplifier ZA such that the transfer speed of the zoom can be the target transfer speed specified by the zoom command signal, thereby controlling the transfer speed of the zoom lens ZL. In the zoom control, the speed of the zoom lens ZL is controlled according to the target transfer speed provided by the zoom demand 20, but the position of the zoom lens ZL can also be controlled by the target position provided by the zoom demand 20.

The camera body not shown in the attached drawings issues an iris command signal for designation of the target position of the diaphragm I to the CPU 10, and the CPU 10 controls the motor IM according to the drive signal output to the amplifier IA such that the position (open/close status) of the diaphragm can be the target position specified by the iris command signal, thereby controlling the position of the diaphragm I.

The AF circuit 30 detects the focus status of the taking lens indicated by "pre-focus", "post-focus", "in focus", etc. In the AF control, the information about the focus status detected by the AF circuit 30 is supplied from the AF circuit 30 to the CPU 10. The CPU 10 controls the motor FM according to the drive signal output to the amplifier FA in the AF control such that the information about the focus status can indicate "in focus" according to the information about the focus status obtain from the AF circuit 30, thereby controlling the focus lens FL. The process of the CPU 10 controlling the focus lens FL based on the focus status detected by the AF circuit 30 is hereinafter referred to as an AF process.

Figure 2:
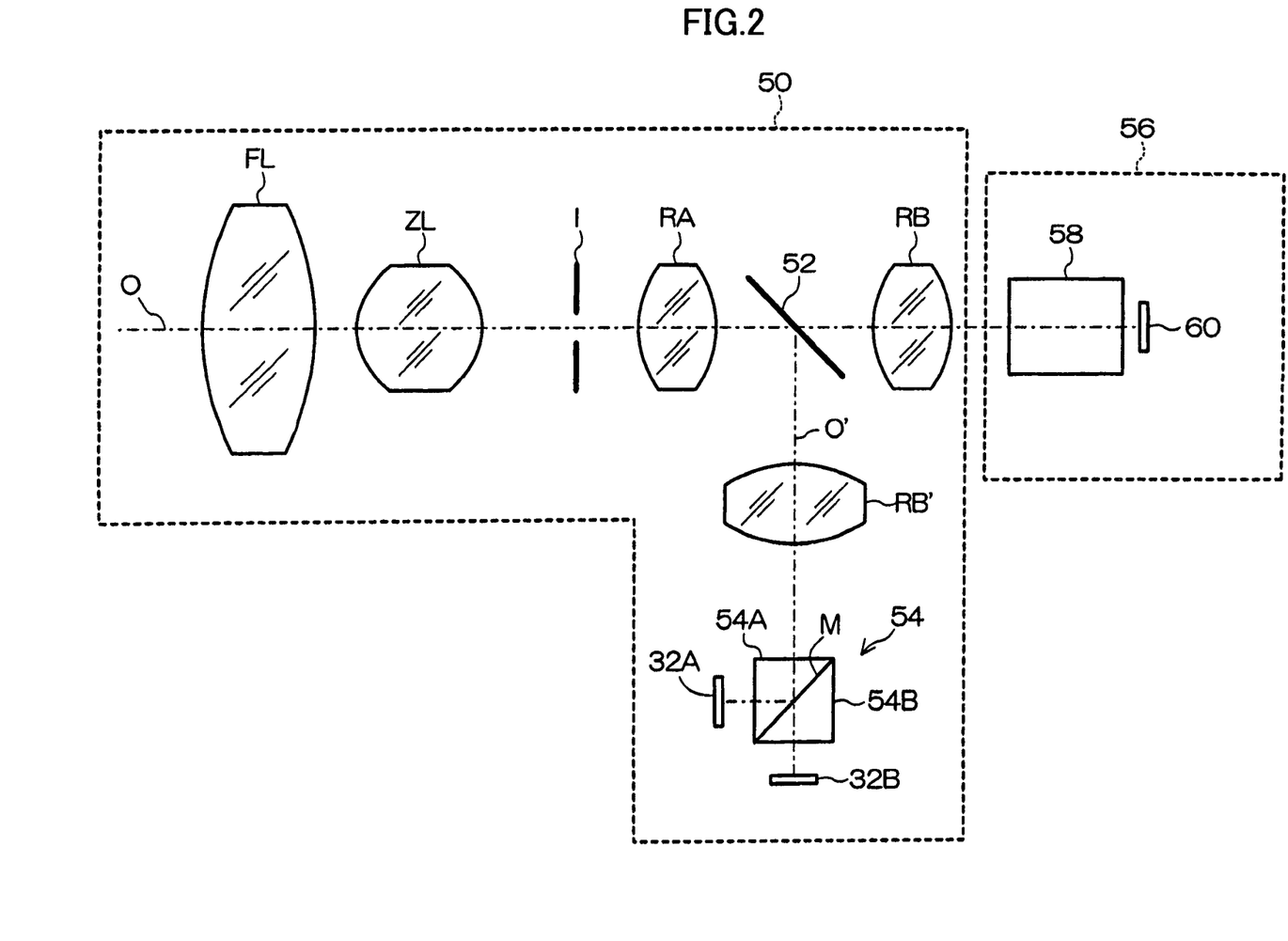
FIG. 2 shows the configuration of the taking lens.

The AF circuit 30 is configured by a pair of CCD 32A and 32B for AF, an A/D converter 34, a gate circuit 36, a high pass filter (HPF) 38, addition circuits 40A and 40B, an CPU 42 for AF, etc. The pair of CCD 32A and 32B for AF are provided separately from the CCD loaded onto the camera body. The CCD of the camera body is a CCD for taking a picture for record or regeneration (hereinafter referred to as a video CCD) while the CCD 32A and 32B for AF are exclusively provided for the AF. For example, it is arranged in the optical system of the taking lens configured as shown in FIG. 2.

The outline of the entire configuration of the taking lens and the arrangements of the CCD 32A and 32B for AF are explained below by referring to FIG. 2. On the optical axis O of a taking lens 50, the focus lens (group) FL, the zoom lens (group) ZL, the iris I, the relay lens (relay optical system) formed by a front relay lens RA and a rear relay lens RB, etc. are sequentially arranged. The subject beam input to the taking lens 50 passes through the above-mentioned lens group, and input to a camera body 56. The camera body 56 includes a color analytic optical system 58 for analyzing the subject beam input from the taking lens 50 into the wavelengths of the three colors of red (R), green (G), and blue (B), and the video CCD for each of R, G, and B which captures an image of the subject beam of each color analyzed. The video CCD of R, G, and B arranged in the position of the optically equivalent optical path length is represented by one video CCD 60 as shown in FIG. 2. The subject beam input to the capture surface of the video CCD 60 is optoelectrically converted, and a predetermined signal processing circuit in the camera body 56 generates a video signal for record or regeneration.

On the other hand, a half mirror 52 is arranged between the front relay lens RA and the rear relay lens RB of the relay optical system of the taking lens 50. The half mirror 52 branches the optical path of the taking lens 50 into two. In the subject beam input to the taking lens 50, the subject beam which has passed through the half mirror 52 is led to the camera body 56 along the optical path of the optical axis O as described above. The subject beam reflected by the half mirror 52 is led to the optical path (optical path for AF) of the optical axis O' substantially perpendicular to the optical axis O.

In the optical path for AF, the relay lens RB' equivalent to the rear relay lens RB, an optical division optical system 54 configured by two prisms 54A and 54B, and the CCD 32A and 32B for AF are arranged. The subject beam reflected by the half mirror 52 and led to the optical path for AF passes through the relay lens RB', and input to the optical division optical system 54. The subject beam input to the optical division optical system is branched into two subject beams having equivalent light quantity by the half mirror face M at the joint of a first prism 54A and a second prism 54B. The subject beam reflected by the half mirror face M is input to one capture surface of the CCD 32A for AF, and the subject beam which has passed through the half mirror face M is input to the capture surface of the other CCD 32B for AF.

Figure 3:
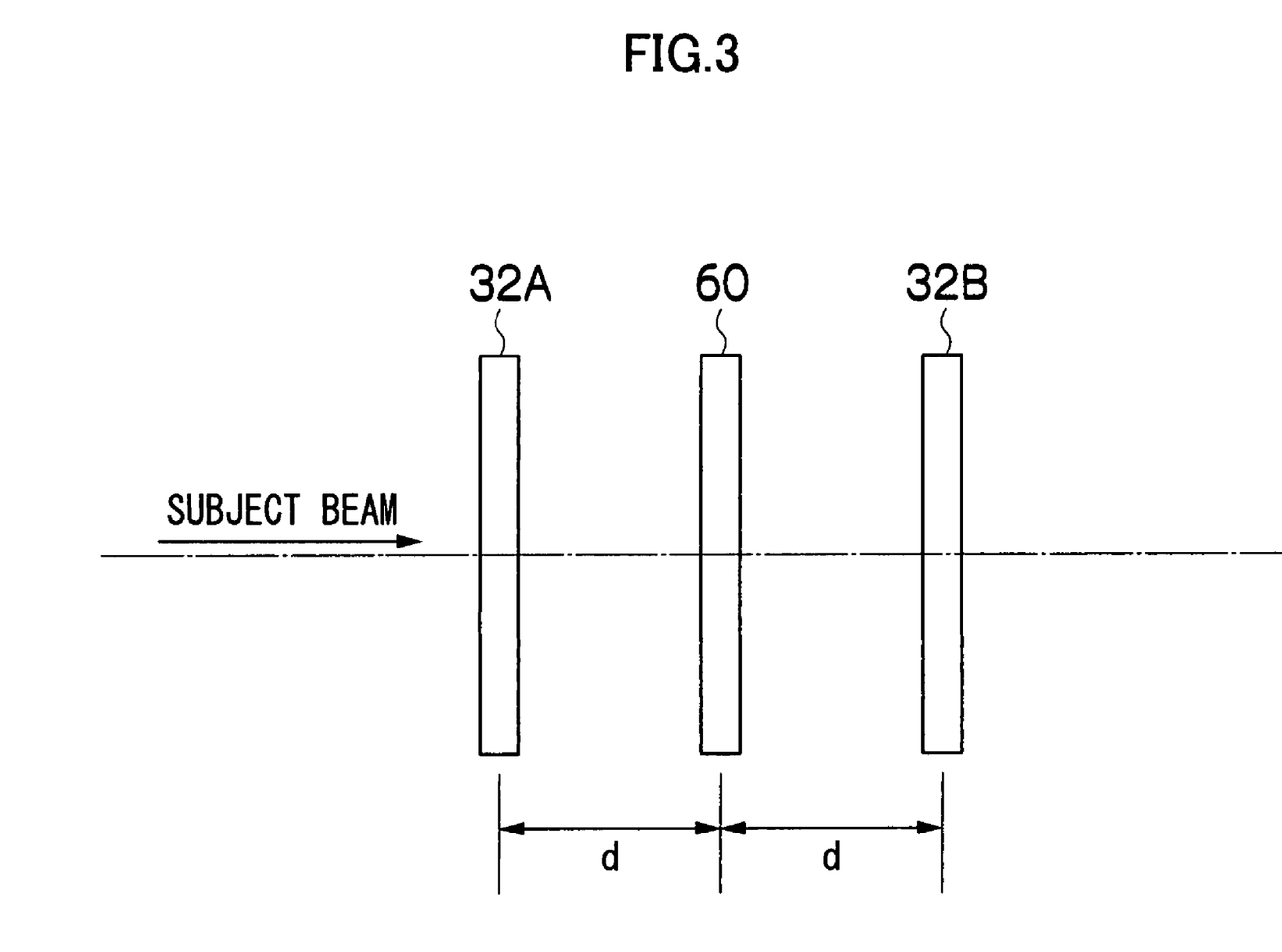
FIG. 3 is an explanatory view showing the difference in optical path length of a CCD for AF.

FIG. 3 is a view of the video CCD 60 and the CCD 32A and 32B for AF of the camera body 56 represented on the same optical axis. As shown in FIG. 3, the optical path length of the subject beam input to one CCD 32A for AF is set shorter than the optical path length of the subject beam input to the other CCD 32B for AF, and the optical path length of the subject beam input to the capture surface of the video CCD 60 is set to have an intermediate length. That is, (the capture surfaces of) a pair of CCD 32A and 32B for AF are arranged to be positioned at the equal distance d in front and back to the capture surface of the video CCD 60.

Thus, by a pair of CCD 32A and 32B for AF arranged in the camera body 56, a video signal equivalent to the case in which the subject beam input to the taking lens 50 is arranged in the position equal from the capture surface of the video CCD 60 in the front and rear distances can be obtained. It is not necessary that the CCD 32A and 32B for AF have to capture a color picture. In the present embodiment, a monochrome video signal (brightness signal) is obtained from the CCD 32A and 32B for AF.

In the AF circuit 30 shown in FIG. 1, the video signal obtained by each of the CCD 32A and 32B for AF is first converted to a digital signal by the A/D converter 34, and then input to the gate circuit 36. In the gate circuit 36, a video signal in a range corresponding to a predetermined AF area (for example, the rectangular area in the center of the screen) set in a shooting range (screen) is extracted. The extracted video signal in the AF area is then output to the HPF (high pass filter) 38, and the HPF 38 extracts a signal of a high-frequency component only.

A signal of a high-frequency component extracted by the HPF 38 obtained by the CCD 32A for AF is added up by the addition circuit 40A, and that obtained by the CCD 32B for AF is added up by the addition circuit 40B field by field, and the add-up value is read by the CPU 42 for AF for each field.

Thus, the add-up values obtained by the addition circuits 40A and 40B indicate the level of the contrast of the subject image captured by the CCD 32A and 32B for AF. In the present specification, the add-up value is referred to as a focus evaluation value. The focus evaluation value obtained by a video signal of the CCD 32A for AF is called a focus evaluation value of chA, and the focus evaluation value obtained by a video signal of the CCD 32B for AF is called a focus evaluation value of chB.

Figure 4:
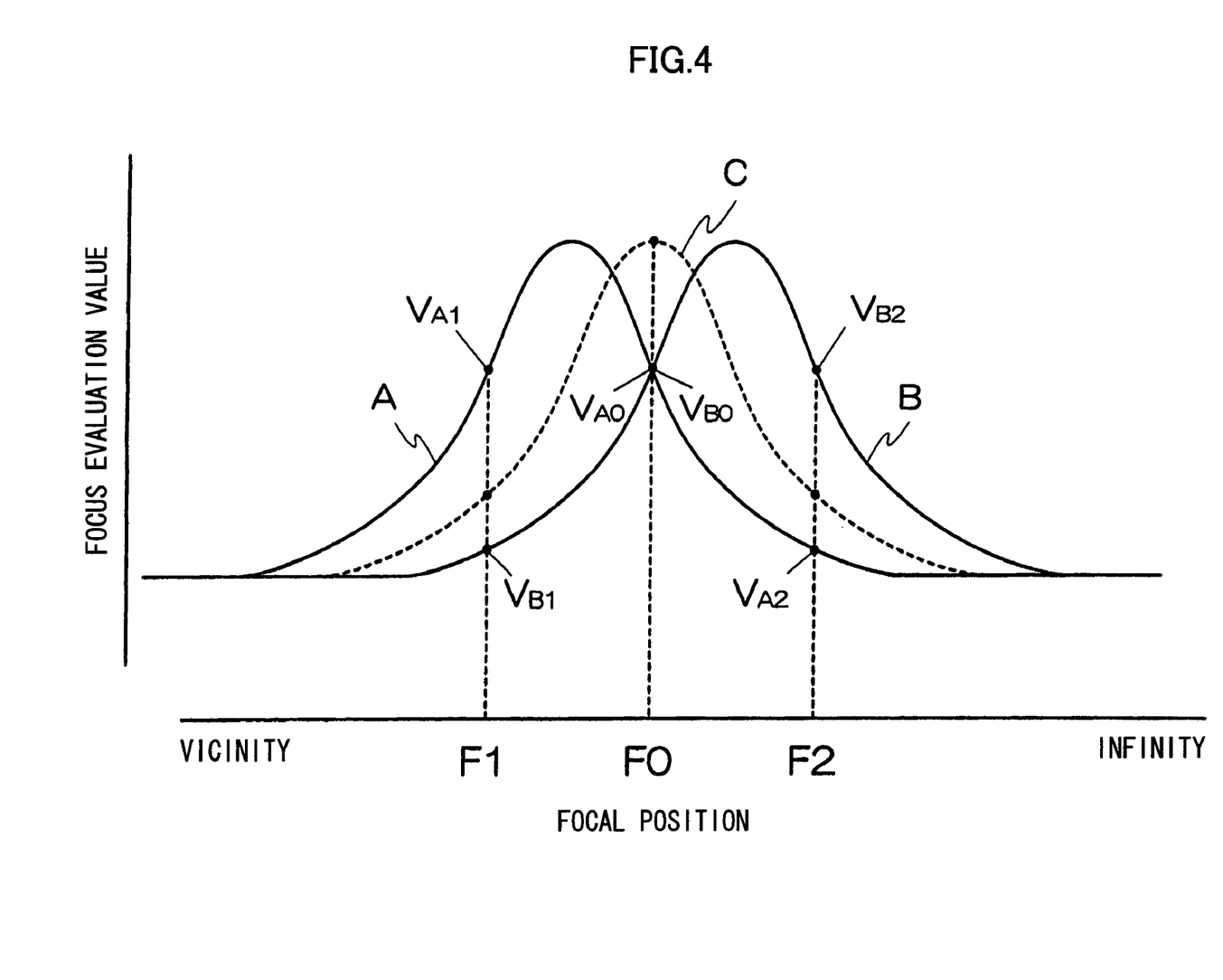
FIG. 4 illustrates the relationship between the focal position of a taking lens and the focus evaluation value obtained by a pair of CCDs for AF.

The CPU 42 for AF detects the focus status of the taking lens for the video CCD 60 based on the obtained focus evaluation value of chA and chB. The detection of the focus status is performed in the following principle. FIG. 4 shows an example of the relationship between the focal position when a subject is taken with the horizontal axis indicating the position of the focus lens FL of the taking lens (focal position) and the vertical axis indicating the focus evaluation value. The curves A and B indicated by solid lines in FIG. 4 show the focus evaluation values of chA and chB obtained by the CCD 32A and 32B for AF relative to the focal position. The curve C shown by dotted lined in FIG. 4 shows the focus evaluation value obtained when it is assumed that the focus evaluation value is obtained by the video signal obtained from the video CCD 60 relative to the focal position.

In FIG. 4, the focus status is "in focus" when the focus is set to the focal position F0 when the focus evaluation value of the video CCD 60 indicated by the curve C is the maximum value (peak). If the focus of the taking lens is set to the focal position F1 in the vicinity rather than the focal position F0, then the focus evaluation value of chA is the value $V_{A1}$ of the curve corresponding to the focal position F1, and the focus evaluation value of chB is the value $V_{B1}$ of the curve B corresponding to the focal position F1. In this case, as shown in FIG. 4, the focus evaluation value $V_{A1}$ of chA is larger than the focus evaluation value $V_{B1}$ of chB. Therefore, when the focus evaluation value $V_{A1}$ of chA is larger than the focus evaluation value $V_{B1}$ of chB, the focus is set in the vicinity than the focal position F0, that is, the status of "pre-focus".

When the focus of the taking lens is set in the focal position F2 on the infinity side than the focal position F0, the focus evaluation value of chA is the value $V_{A2}$ of the cure A corresponding to the focal position F2, and the focus evaluation value of chB is the value $V_{B2}$ of the curve B corresponding to the focal position F2. In this case, the focus evaluation value $V_{A2}$ of chA is smaller than the focus evaluation value $V_{B2}$ of chB. Thus, when the focus evaluation value $V_{A2}$ of chA is smaller than the focus evaluation value $V_{B2}$ of chB, the focus is set on the infinity side than the focal position F0, that is, the status of "post-focus".

On the other hand, when the focus of the taking lens is set to the focal position F0, that is, in the focal position, the focus evaluation value of chA is the value $V_{A0}$ of the curve A corresponding to the focal position F0, and the focus evaluation value of chB is the value $V_{B0}$ of the curve B corresponding to the focal position F0. In this case, the focus evaluation value $V_{A0}$ of chA equals the focus evaluation value $V_{B0}$ of chB. Therefore, when the focus evaluation value $V_{A0}$ of chA equals the focus evaluation value $V_{B0}$ of chB, the focus is set to the focal position F0, that is, the focus status.

Thus, using the focus evaluation values of chA and chB, the current focus status of the taking lens can be detected relative to the video CCD 60, that is, "pre-focus", "post-focus", or "in focus".

In FIG. 1, when the CPU 42 for AF detects the focus status of the taking lens for the video CCD 60 based on the focus evaluation value of chA and chB, it transmits the information about the detected focus status to the CPU 10 through the 26

The CPU 10 controls the focus lens FL according to the information while sequentially obtaining the information about the focus status from the CPU 42 for AF in the AF control. For example, when the focus status obtained from the CPU 42 for AF refers to the "pre-focus", the focus lens FL is moved to the infinity direction. If the focus status refers to the "post-focus", then the focus lens FL is moved to the vicinity direction. If the focus status obtained from the CPU 42 for AF is "in focus", then the focus lens FL is stopped. Thus, the focus lens FL is moved to the position where the focus status of the taking lens is "in focus", and then stops. Thus, the system of the AF for the automatic adjustment of the focus of a lens using a plurality of CCDs for AF having a difference in optical path length is called a system of difference in optical path length.

In the CPU 42 for AF, not only a focus status is detected, but also an out-of focus level can also be detected from the difference between the focus evaluation values of chA and chB, and the speed of travel of the focus lens FL in the CPU 10 can also be considered. The process performed by the CPU 42 for AF can also be performed by the CPU 10, and it is not always necessary to provide the CPU 42 for AF as in the present embodiment.

Described below is the focus control mode. A selectable focus control mode in the present lens system can be: the MF mode for control of the focus in the manual operation using the focus demand 18, etc.; and the AF mode using the system of the difference in optical path length for focusing by automatically controlling the focus based on the focus status detected by the AF circuit 30. The AF mode has a plurality of modes, and can select from between the momentary mode and the continuous mode.

In the momentary mode, when a predetermined push button switch (AF switch) is pressed, AF control (the AF process is performed by the CPU 10) is performed. If the AF switch is released, the AF control is stopped. According to the present embodiment, while the AF control is stopped, the MF control (the MF process by the CPU 10) is performed. When the MF mode is to be selected, the momentary mode is selected. That is, by selecting the momentary mode and stopping the operation of the AF switch, the focus control as in the normal MF mode can be performed.

The continuous mode is a mode in which the AF control can be continuously performed. If a subject changes and the focal position also changes, the contents of a taking lens travels correspondingly. Furthermore, according to the present embodiment, while a predetermined button switch (AF stop switch) is pressed in the continuous mode, the AF control can be stopped. Therefore, when a target subject is set in focus by the AF in the continuous mode, another subject enters before the function, and there is the possibility that the focus can be transferred correspondingly, the AF stop switch is pressed to stop the AF control, thereby avoiding the trouble.

In the lens system shown in FIG. 1, a mode switch SW1 for selection of the above-mentioned two AF modes, and the AF switch SW2 for designation of the execution of the AF in the momentary mode are provided. The AF stop switch is described later.

These switches SW1 and SW2 are set in predetermined portions of the device configuring a system such as a device loaded with the CPU 10, a controller such as the focus demand 18, a camera body, etc. (the switches can be set at a plurality of portions). For example, if a device loaded with the CPU 10 is a so-called EFP lens which is an EFP lens storing the taking lens and a control system except a part of the system integrally in the box case, it can be mounted in the case unit. If it is a drive unit implemented in the barrel side portion of the taking lens as an ENG lens, it is set in the drive unit.

When each of the switches SW1 and SW2 are mounted in the device connected through the communications with the CPU 10 as the focus demand 18, the ON/OFF status of the switches SW1 and SW2 as shown in FIG. 1 is not directly read by the CPU 10, but the ON/OFF status of the switches SW1 and SW2 is read by the CPU 10 through the communications with the device.

Figure 5:
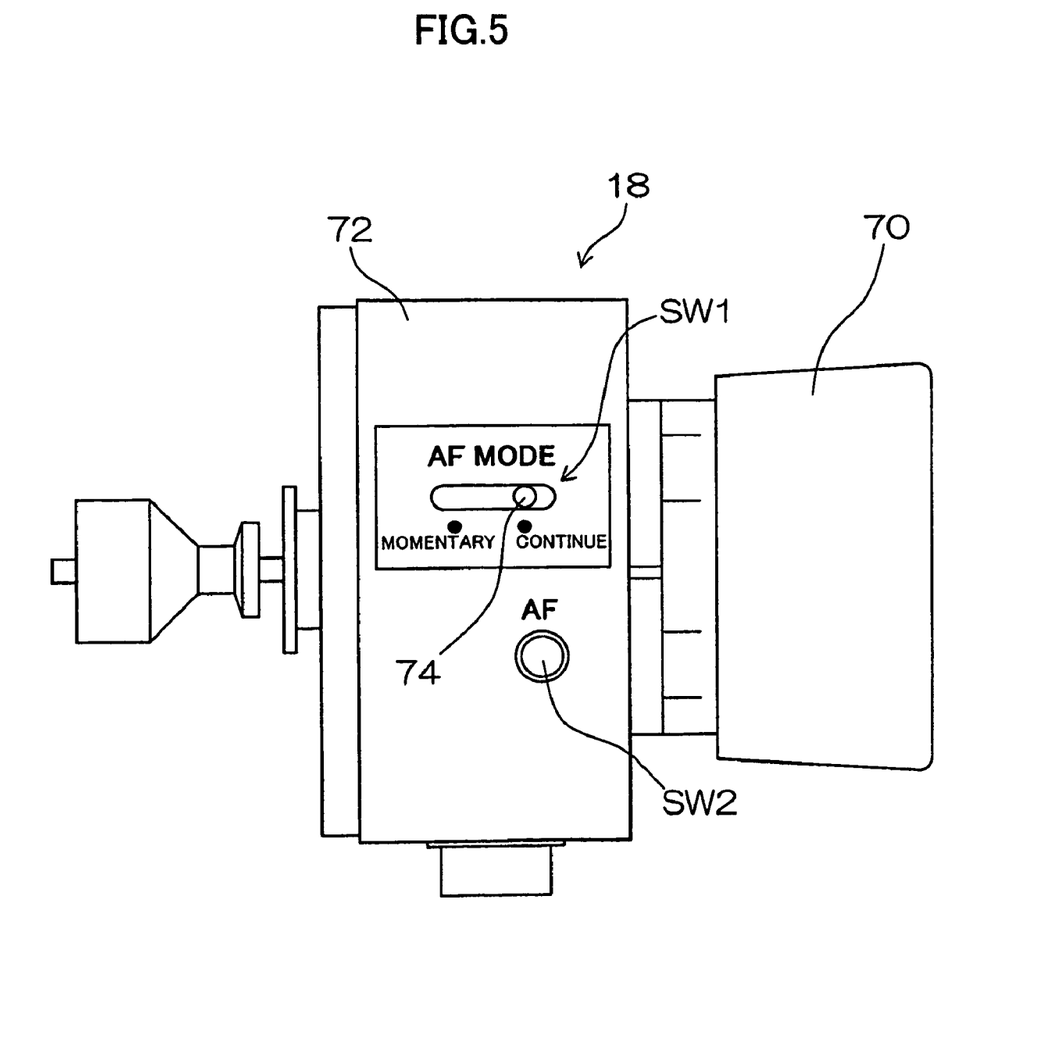
FIG. 5 shows an appearance of the settings of the mode switch and the AF switch in a focus demand.

FIG. 5 shows an appearance of the case in which the mode switches SW1 and the AF switch SW2 are mounted in the focus demand 18. The focus demand 18 has an operation ring 70 which designates the focal position in a manual operation, and the operation ring 70 is attached as rotatable to a body 72. The case of the body 72 is provided with a mode switch SW1 and an AF switch SW2. The mode switch SW1 is a slide switch. When a knob 74 is set in the position described "MOMENTARY" on the left in FIG. 5, the momentary mode can be selected. When the knob 74 is set in the position described "CONTINUE" on the right, the continuous mode can be selected.

The AF switch SW2 is an automatic recovery type push button switch. When the mode switch SW1 selects the momentary mode, and the AF switch SW2 is pressed (turned on), the AF control can be performed while the switch is being pressed. As described above, when the SW2 is not pressed in the momentary mode, the MF control is performed.

When the mode switch SW1 selects the continuous mode, and the AF switch SW2 is pressed, the AF control can be stopped while it is being pressed. That is, the AF switch SW2 is also used as the AF stop switch in the continuous mode. Therefore, the number of necessary switch parts can be reduced, and the AF switch in the momentary mode and the AF stop switch in the continuous mode can be arranged in easily operated positions. However, the AF stop switch can be separated from the AF switch SW2.

In FIG. 1, the CPU 10 reads the ON/OFF status of the mode switch SW1 and the AF switch SW2 from the focus demand 18, etc. and the above-mentioned focus control is performed based on the ON/OFF status of the switches SW1 and SW2.

For example, if the mode switch SW1 is in the off status, it is determined that the momentary mode has been selected. When the mode switch SW1 is in the ON status, then it is determined that the continuous mode is selected. If the AF switch SW2 is in the OFF status, it is determined that the AF switch SW2 is not pressed. If the AF switch SW2 is in the ON status, it is determined that the AF switch SW2 has been pressed.

The CPU 10 performs the process in the momentary mode when the mode switch SW1 is in the OFF status. In the momentary mode, if the AF switch SW2 is not pressed and in the OFF status, the AF process is not performed, but the above-mentioned MF process is performed. That is, the process of controlling the focus lens FL according to the focus command signal from the focus demand 18 is performed. On the other hand, if the AF switch SW2 is pressed and in the off states, the AF process is performed. That is, the process of controlling the focus lens FL based on the current focus status obtained from the AF circuit 30 is performed. When the AF switch SW2 is released and in the OFF status, the AF process is switched to the MF process.

When the AF switch SW2 is switched from the ON status to the OFF status, the AF process may be stopped and the MF process can take place regardless of the focus status detected by the AF circuit 30, or the AF process is first performed and then the MF process is performed until focus can be gained if the focus status detected by the AF circuit 30 does not indicate the focus when the AF switch SW2 is switched from the ON status to the OFF status. Furthermore, according to the present embodiment, the MF control can be performed by selecting the momentary mode as the AF mode without specifically selecting the AF mode. Therefore, although the MF process is performed when the AF switch SW2 is in the OFF status in the momentary mode, the application is not so restricted. For example, when the AF switch SW2 is in the OFF status in the momentary mode, the process of only stopping the focus lens FL can be performed.

That is, when the AF switch SW2 is in the OFF status, and the AF control is stopped, any process is performed but is not specific. The process is hereinafter referred to as an AF stop process.

On the other hand, the CPU 10 performs a process in the continuous mode when the mode switch SW1 is in the ON status. In the continuous mode, the AF switch SW2 is not pressed and in the OFF status, the above-mentioned AF process is continuously performed. When the AF switch SW2 is pressed and in the ON status, the AF stop process is performed. That is, the AF process is stopped switched and the MF process take place, for example. If a manual operation by the focus demand 18 is not performed although the MF process takes place, the focus lens FL stops. The transfer to the MF process is not performed to make the control of MF valid, but to fix the focus lens FL. Therefore, the AF stop process is not limited to the MF process, but can be a simple process of stopping the focus lens FL. When the AF switch SW2 is separated and turned from the ON status to the OFF status, the AF stop process is switched to the AF process.

Figure 6:
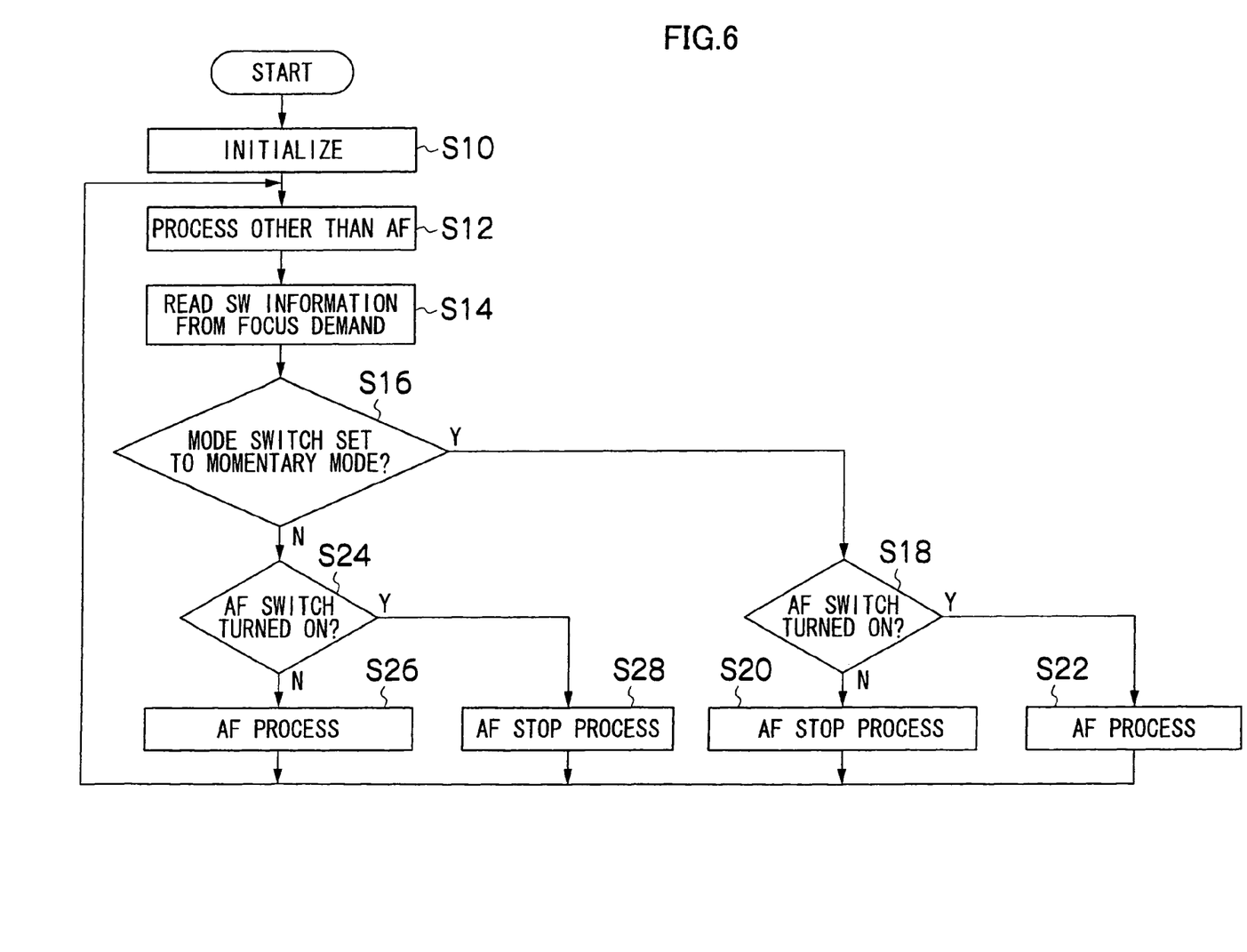
FIG. 6 is a flowchart of the procedure of selecting the contents of the process in each AF mode in the CPU.

FIG. 6 is a flowchart of the procedure of selecting the contents of the process in the AF mode in the CPU 10. The CPU 10 first performs necessary initialization (step S10), it performs a process other than AF (step S12). Then, it reads switch information from the focus demand 18, and detects the ON/OFF status of the mode switch SW1 and the AF switch SW2 (step S14). Then, it is determined whether or not the mode switch SW1 is set in the momentary mode (step S16).

If the determination result is YES, that is, it is determined that the momentary mode is set, then it is determined whether or not the AF switch SW2 is in the ON status (step S18). If the determination result is NO, the AF stop process is performed (step S20). That is, in the present embodiment, the MF process is performed. If the determination result is YES, the AF process is performed (step S22). However, step S22 does not refer to performing the AF process until the focus status becomes "in focus" in one process, but refers to performing the process in predetermined units in the AF process until the focus status becomes "in focus". The process in step S26 described later is substantially the same.

If it is NO in step S16, that is, if it is determined that the mode switch SW1 is continuously set, then it is determined that the AF switch SW2 is in the ON status (step S24). If it is determined NO, the AF process is performed (step S26). If it is determined YES, the AF stop process is performed (step S28). That is, the AF process is stopped, and the position of the focus lens FL is stopped regardless of the focus status detected by the AF circuit 30.

As described above, after the process in step S20, S22, S26, or S28, control is returned to step S12, and the processes in step S12 are repeated.

In the embodiments, as a system of AF, the autofocus system in which a so-called optical path length system is used using two CCD 32A and 32B for AF has been described above, but the present invention can be applied to the autofocus in a desired system other than the optical path length difference system.

Other than the autofocus system for use in the broadcasting TV camera, the present invention can be applied as an autofocus system in a video camera for taking movies, or a video camera of consumer uses.

Figure 7:
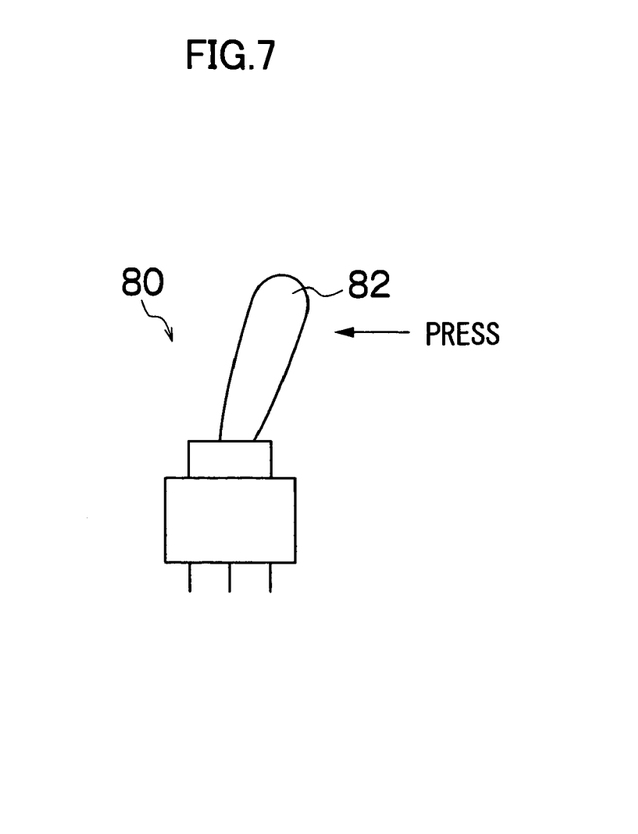
FIG. 7 shows another embodiment of an AF switch.

In the above-mentioned embodiment, the AF switch SW2 also used as an AF stop switch in a continuous mode can be a push button system, but the present invention is not limited to this application. For example, the AF switch SW2 can be a toggle switch 80 of a back-and-forth as shown in FIG. 7. As a result, when the lever 82 of the toggle switch 80 is not used, the lever 82 is inclined in a predetermined direction (diagonally up toward right in FIG. 7) and in the OFF status (corresponding to the status releaving the AF switch 2), when the lever 82 is operated from the center toward left in FIG. 7 and inclined reversely, it is in the on state (corresponding to the status pushing the AF switch SW2). When the operation of the lever 82 stops, the lever 82 recovers to the OFF status.

Figure 8:
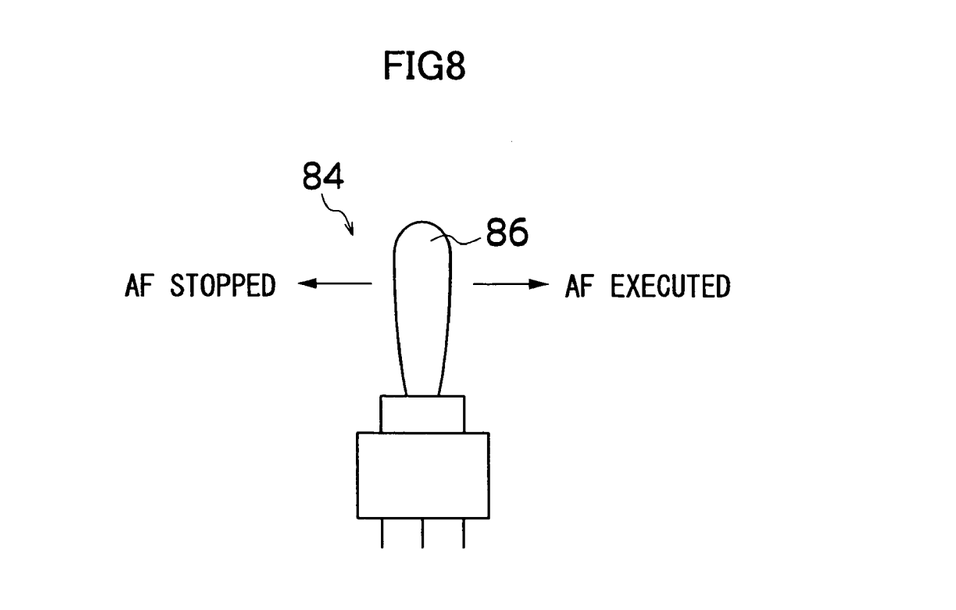
FIG. 8 shows another embodiment of an AF switch.

The AF switch SW2 can be the recover type toggle switch 84 of the center restoring type as shown in FIG. 8. The toggle switch 84 is in the OFF status when the lever 86 is in the center, and is the ON status at different connection points when the lever 86 is operated from the center toward right and left in FIG. 8. In this way, in the momentary mode, when the lever 86 is operated from the center toward right in FIG. 8, AF is performed (the operation toward left is invalid). In the continuous mode, AF is stopped when the lever 86 is operated toward left in FIG. 8 (the operation toward right is invalid). Thus, the operation of the execution of the AF in the momentary mode can be discriminated from the operation of stop of AF in the continuous mode.

What is claimed is:

1. An autofocus system having an AF control device which automatically adjusts focus of a lens by controlling the focus of a taking lens, comprising:

a predetermined AF switch;

a predetermined AF stop switch;

a mode selection device which selects one of a momentary mode in which the AF control device performs control of focus for the automatic adjustment of the focus of a lens when the AF switch is operated, and stops the control of the focus for the automatic adjustment of the focus of a lens when an operation of the AF switch is stopped, and a continuous mode in which the AF control device continuously performs control of focus for the automatic adjustment of the focus of a lens, wherein the mode selection device is a slide switch;

the AF control device stops control of the focus for the automatic adjustment of the focus of a lens while the AF stop switch is being operated;

the AF control device starts AF operation when the AF stop switch is released in continuous mode; and the AF stop switch is effective in the continuous mode, and can also function as the AF switch.

2. The autofocus system according to claim 1, wherein the AF control device controls focus for automatic adjustment of the focus of a lens based on contrast of a subject image captured on a plurality of capture surfaces arranged in positions of variable differences in optical path length.

* * * * *